US008511055B2

(12) United States Patent
DiBenedetto et al.

(10) Patent No.: US 8,511,055 B2
(45) Date of Patent: Aug. 20, 2013

(54) APPARATUS AND METHOD FOR PROVIDING DAMPER LIQUID IN A GAS TURBINE

(75) Inventors: Enzo DiBenedetto, Torrington, CT (US); James B. Coffin, Windsor, CT (US); Todd A. Davis, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1125 days.

(21) Appl. No.: 12/470,875

(22) Filed: May 22, 2009

(65) Prior Publication Data

US 2010/0296947 A1 Nov. 25, 2010

(51) Int. Cl.
*F02C 7/06* (2006.01)

(52) U.S. Cl.
USPC .......... 60/39.08; 60/268

(58) Field of Classification Search
USPC .......... 184/6.11; 475/159; 415/26, 47; 416/42; 384/99; 60/204, 39.08, 39.162, 60/268, 226.1, 262, 802
See application file for complete search history.

(56) References Cited

U.S. PATENT DOCUMENTS 1,871,055 A 8/1932 Hasbrouck
2,239,098 A 4/1941 Hunter
2,324,464 A 7/1943 Parker
2,494,209 A 1/1950 Sikorsky
2,826,255 A * 3/1958 Peterson .......... 416/32
2,830,668 A 4/1958 Gaubis et al.
2,831,490 A 4/1958 Simcock
2,984,975 A 5/1961 Rodgers et al.
3,025,672 A * 3/1962 Syrovy .......... 60/246
3,834,157 A * 9/1974 Hoffmann .......... 60/39.093
4,062,185 A * 12/1977 Snow .......... 60/204
4,117,907 A 10/1978 Lechler
4,153,141 A 5/1979 Methlie
4,252,140 A 2/1981 Hildebrandt
4,309,870 A 1/1982 Guest et al.
4,367,638 A 1/1983 Gray
4,669,893 A 6/1987 Chalaire et al.
4,782,658 A 11/1988 Perry
4,813,445 A 3/1989 Lu
4,947,639 A 8/1990 Hibner et al.
4,974,410 A 12/1990 Wright et al.
4,983,051 A 1/1991 Hibner et al.
5,110,257 A 5/1992 Hibner et al.
5,344,239 A 9/1994 Stallone et al.
5,433,674 A 7/1995 Sheridan et al.
5,472,383 A 12/1995 McKibbin
5,590,736 A 1/1997 Morris et al.
5,911,678 A * 6/1999 White .......... 60/39.08
6,223,616 B1 5/2001 Sheridan
6,267,147 B1 7/2001 Rago
6,793,042 B2 9/2004 Broullet
7,118,336 B2 10/2006 Waddleton (Continued)

OTHER PUBLICATIONS

Extra-Flugzeugbau GmbH, Service Manual Extra 300, Chapter 79—Oil System, page date: Jan. 31, 1995, pp. 1-12.

*Primary Examiner* — Phutthiwat Wongwian
(74) *Attorney, Agent, or Firm* — Kinney & Lange, P.A.

(57) ABSTRACT

A fluid distribution system for use in a gas turbine engine includes a fan shaft, a damper, a bearing, and a pump. The damper supports the bearing, and the bearing supports the fan shaft. The pump is connected to and driven by the fan shaft. The pump is also fluidically connected to the damper.

12 Claims, 2 Drawing Sheets

(56) References Cited

U.S. PATENT DOCUMENTS 8,201,389 B2 * 6/2012 Eleftheriou et al. ......... 60/39.08
2007/0157596 A1 * 7/2007 Moniz ........................ 60/39.162
2008/0063333 A1 3/2008 Bruno et al.
2008/0116009 A1 * 5/2008 Sheridan et al. ............... 184/6.4

* cited by examiner

APPARATUS AND METHOD FOR PROVIDING DAMPER LIQUID IN A GAS TURBINE

CROSS-REFERENCE TO RELATED APPLICATIONS

Reference is made to application Ser. No. 12/470,823 entitled "WINDMILL AND ZERO GRAVITY LUBRICATION SYSTEM" and application Ser. No. 12/470,903 entitled "GRAVITY OPERATED VALVE" which are filed on even date and are assigned to the same assignee as this application, the disclosures of which are incorporated by reference in their entirety.

Reference is also made to application Ser. No. 12/393,743 entitled "AUXILIARY PUMP SYSTEM FOR FAN DRIVE GEAR SYSTEM", filed on Feb. 26, 2009 by William G. Sheridan and is assigned to the same assignee as this application, the disclosure of which is incorporated by reference in its entirety.

BACKGROUND

The present invention relates to a system for distributing liquid, and in particular, to a system for distributing liquid to a damper in a gas turbine engine.

Gas turbine engines typically have shafts for fans and spools that rotate at high speed during operation. Small imbalances associated with the rotating shafts can cause these shafts to vibrate in a radial direction with respect to a centerline axis of the shaft. Such vibrating motion is commonly referred to as synchronous vibration or whirl of the shaft. Amplitude of the vibration can become relatively large as the frequency approaches or passes through a resonant frequency of the overall system. These shafts are typically supported by bearings, which, tend to be relatively stiff and transmit vibration to the engine. In order to reduce engine damage as a result of this vibration, one or more of the bearings are often supported by a damper such as a thin fluid film vibration damper. These dampers damp the vibration amplitude and can also shift the resonant frequency of the system.

Thin fluid film vibration dampers use a thin film of liquid positioned between two closely spaced surfaces to achieve the damping effect. Typical gas turbine engines supply this liquid with a main lubricating liquid pump. The main lubricating liquid pump is usually driven off the high pressure spool and positioned toward the aft of the engine. In order to supply liquid to a damper near the front of the engine, a relatively large amount of external piping is used to span the distance. That piping can take up space and add undesired weight to the engine.

SUMMARY

According to the present invention, a fluid distribution system for use in a gas turbine engine includes a fan shaft, a damper, a bearing, and a pump. The damper supports the bearing, and the bearing supports the fan shaft. The pump is connected to and driven by the fan shaft. The pump is also fluidically connected to the damper.

Another embodiment includes a method for distributing liquid in a gas turbine engine. The method includes rotating a fan shaft coupled to a spool via a fan drive gear system, driving a pump via the fan shaft, and pumping liquid from the pump to a damper.

DETAILED DESCRIPTION

Figure 1:
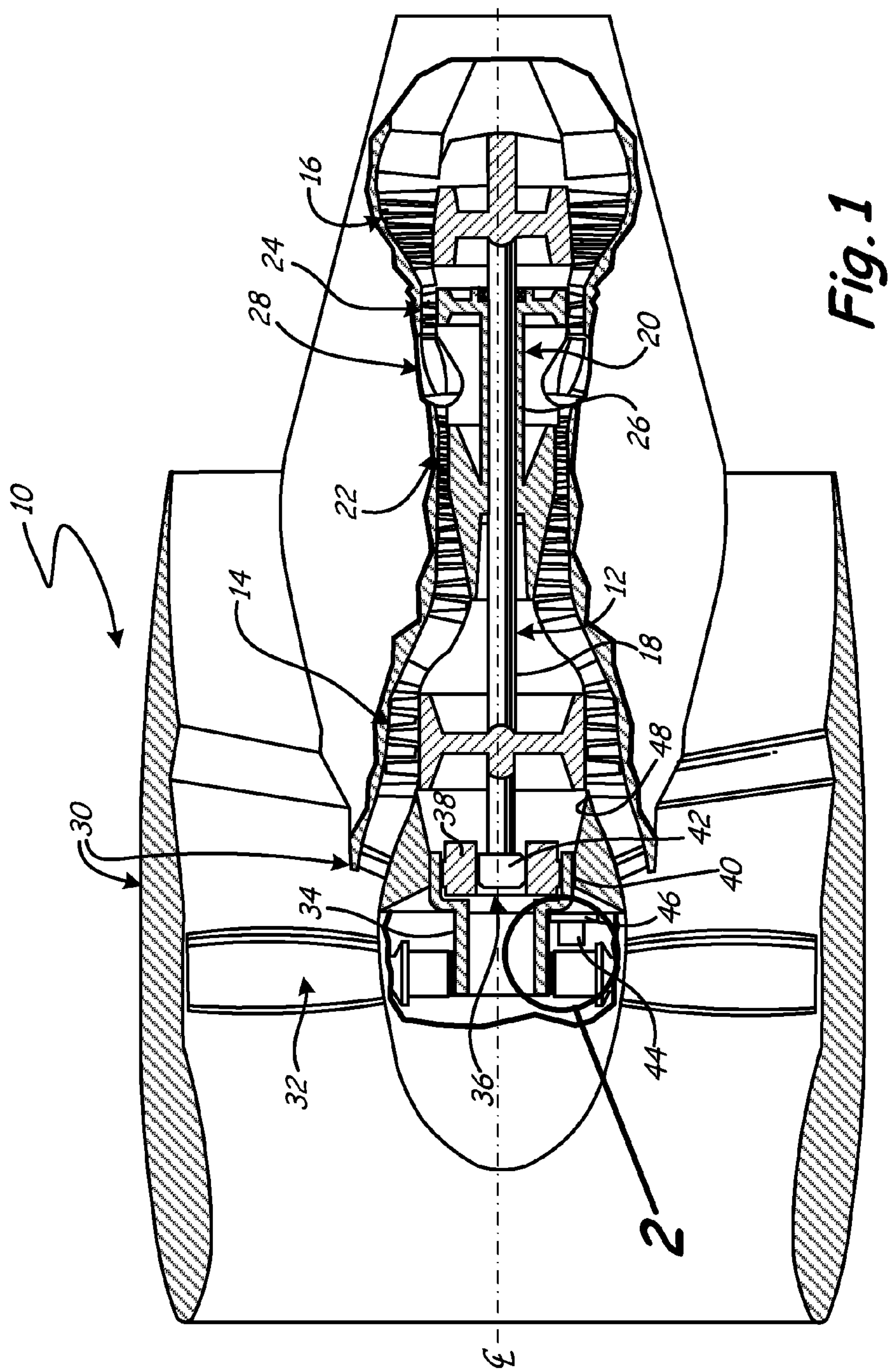
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves around sun gear 42, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both of fan 32 and low pressure spool 12.

Pump 44 is coupled to and is driven by fan shaft 34 via pump gear 46 such that pump 44 can operate whenever fan shaft 34 is rotating. Pump 44 supplies liquid, such as oil, to lubricate gears and bearings of fan drive gear system 36. Fan drive gear system 36 benefits from a relatively continuous supply of lubricating liquid whenever fan shaft 34 is rotating. At least some of the liquid supplied to fan drive gear system 36 drains to sump 48 and is eventually pumped back through pump 44.

Figure 2:
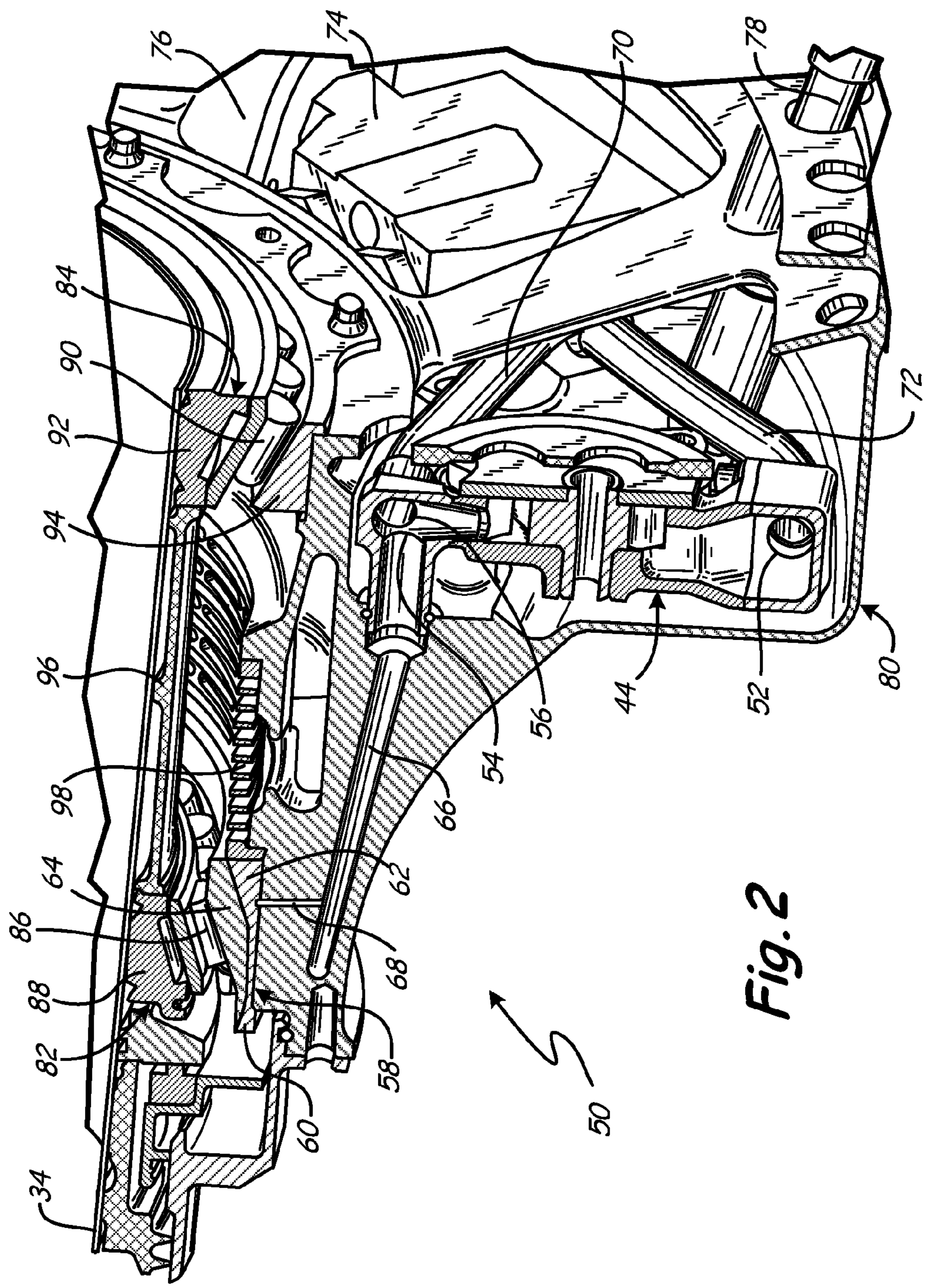
FIG. 2 is a schematic sectional view, taken from FIG. 1, of a liquid distribution system for use in the gas turbine engine of FIG. 1.

FIG. 2 is a schematic sectional view, taken from FIG. 1, of liquid distribution system 50. Liquid distribution system 50 includes pump 44 (which includes pump inlet 52, first pump outlet 54, and second pump outlet 56), squeeze film vibration damper 58 (which includes squeeze film chamber 60 spaced between damper outer sleeve 62 and damper inner sleeve 64), and wide and narrow damper supply passages 66 and 68 fluidically connecting first pump outlet 54 to squeeze film vibration damper 58. Pump 44 supplies high pressure liquid, such as oil, through wide damper supply passage 66, through narrow damper supply passage 68, and into squeeze film chamber 60. Pressure of liquid in squeeze film chamber 60 can be selected to provide a suitable amount of damping for a particular application.

Liquid distribution system 50 further includes gear bearing supply passage 70 fluidically connecting second pump outlet 56 to fan drive gear system 36 (shown in FIG. 1) and pump inlet passage 72 fluidically connecting valve 74 to pump inlet 52. Valve 74 is fluidically connected to and adjacent to auxiliary reservoir 76 as well as fluidically connected to sump 48 via sump scavenge passage 78. Pump 44 supplies lubricating liquid to journal bearings (not shown) for gears of fan drive gear system 36 (shown in FIG. 1) through gear bearing supply passage 70. A different valve (not shown) can be placed along gear bearing supply passage 70 to selectively restrict liquid from pump 44 from reaching fan drive gear system 36. For example, liquid from pump 44 can be redirected to sump 48 except when a main pump system (not shown) fails to supply adequate liquid to fan drive gear system 38. In that sense, pump 44 can be a backup or auxiliary lubrication pump.

Valve 74, on the other hand, selectively restricts whether liquid from sump 48 or auxiliary reservoir 76 is supplied to pump inlet 52. Valve 74 can select between these liquid sources based upon an engine operating condition. For example, auxiliary reservoir 76 is an enclosed container that is kept substantially full of liquid during positive gravity conditions so that it can be ready to supply a relatively continuous supply of liquid during zero and negative gravity conditions. Auxiliary reservoir 76 does not, however, hold enough liquid to provide a continuous supply for long periods of time unless auxiliary reservoir 76 is continuously replenished by the main pump system (not shown). Sump 48, on the other hand, can provide liquid for long periods of time even without replenishment from the main pump system (not shown). However, sump 48 is an open container that will not hold liquid in one place during zero and negative gravity conditions. In one embodiment, valve 74 can supply liquid from sump 48 to pump 44 during positive gravity conditions and supply liquid from auxiliary reservoir 76 to pump 44 during zero and negative gravity conditions. Valve 74 can include a weight (not shown) for actuating between the two input sources. In another embodiment, valve 74 can supply liquid from auxiliary reservoir 76 when gas turbine engine 10 is running at operating speed and supply liquid from sump 48 when gas turbine engine 10 is running below operating speed. Valve 74 can include a pressure sensor (not shown) for actuating between the two input sources.

Bearing compartment 80 can be a support structure for supporting fan shaft 34. No. 1 bearing 82 and No. 1.5 bearing 84 are positioned between bearing compartment 80 and fan shaft 34. No. 1 bearing 82 includes rollers 86 positioned between inner race 88 and damper inner sleeve 64. Damper inner sleeve 64 functions as both an inner sleeve for damper 58 and an outer race for No. 1 bearing 82. Thus, fan shaft 34 is supported by No. 1 bearing 82 which is supported by damper 58 which is supported by bearing compartment 80. No. 1.5 bearing 84 includes rollers 90 positioned between inner race 92 and outer race 94. In the illustrated embodiment, outer race 94 is positioned directly adjacent a portion of bearing compartment 80. In another embodiment, No. 1.5 bearing 84 can be supported by a squeeze film vibration damper in a manner similar to that of No. 1 bearing 82. Inner race 88 is spaced from inner race 92 by spacer 96. Spring 98 is compressed between damper 58 and a flange of bearing compartment 80 in an axial direction with respect to fan shaft 34. Spring 98 keeps pre-load on No. 1 bearing 82 under substantially all operating conditions.

As fan shaft 34 rotates, it can vibrate and impart relatively strong forces radially outward from centerline $C_L$ to No. 1 bearing 82. These forces are transmitted to damper inner sleeve 64, which is pressed out toward damper outer sleeve 62, squeezing the film of liquid between. Since damper inner and outer sleeves 62 and 64 are annular, compressing damper inner and outer sleeves 62 and 64 together at one location creates more space between damper inner and outer sleeves 62 and 64 at another location for the liquid to flow to. Because the liquid is under high pressure and relatively viscous, vibration is dampened as the liquid is squeezed from one location in damper 58 to another.

Vibration can press inner sleeve 64 toward outer sleeve 62 with such force that a pressure wave is created in the liquid. The pressure wave can be strong enough to damage pump 44 if allowed to transmit back to pump 44. In the illustrated embodiment, narrow damper supply passage 68 is narrow enough to restrict pressure wave travel through narrow damper supply passage 68. Wide damper supply passage 66 is wider than narrow damper supply passage 68 to provide ample fluid to narrow damper supply passage 68 and to allow narrow damper supply passage 68 to be the limiting structure.

Because pump 44 is positioned relatively close to damper 58, wide and narrow damper supply passages 66 and 68 can be relatively short. Positioning pump 44, damper 58, and No. 1 bearing 82 all inside bearing compartment 80 helps make such short distances possible. In one embodiment, wide and narrow damper supply passages 66 and 68 can have a combined length of less than about 2 feet (about 0.6096 meters). In another embodiment, wide and narrow damper supply passages 66 and 68 can have a combined length of less than about 1 foot (about 0.3048 meters) so long as pump 44 is sufficiently close to damper 58.

Overall weight of gas turbine engine 10 can be further reduced by extending a portion of one of wide and narrow damper supply passages 66 and 68 through a support structure, such as bearing compartment 80, as opposed to running external piping. In the illustrated embodiment, substantially all of wide and narrow damper supply passages 66 and 68 extend through bearing compartment 80. This not only reduces weight, but also takes up less space in gas turbine engine 10.

It will be recognized that the present invention provides numerous benefits and advantages. For example, damper 58 dampens fan shaft vibration, thus reducing vibration induced damage to gas turbine engine 10. Because pump 44 is the auxiliary pump driven off fan shaft 34, liquid distribution system 50 can supply liquid to damper 58 during certain extraordinary engine operating conditions, such as zero and negative gravity conditions. Because pump 44 is positioned relatively close to damper 58, wide and narrow damper supply passages 66 and 68 can be relatively short, reducing overall weight and space taken by liquid distribution 50. Overall weight and space taken by liquid distribution 50 are further reduced by plumbing wide and narrow damper supply passages 66 and 68 through bearing compartment 80 as opposed to adding external pipes.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, pump 44 need not be an auxiliary lubrication pump so long as pump 44 is driven by fan shaft 32 and supplies liquid to bearing 58.

The invention claimed is:

1. A fluid distribution system for use in a gas turbine engine, the fluid distribution system comprising:

a spool including a compressor connected to a turbine via a spool shaft;

a fan shaft connected through a fan drive gear system to the spool, such that the spool drives rotation of the fan shaft through the fan drive gear system during operation of the gas turbine engine;

a bearing supporting the fan shaft;

a squeeze film damper supporting the bearing, wherein the squeeze film damper is spaced between a damper outer sleeve and a damper inner sleeve and includes a narrow damper supply passage capable of damping pressure changes in fluid therein to dampen fan shaft vibration; and a pump connected to and driven by the fan shaft and fluidically connected to the damper.

2. The fluid distribution system of claim 1, and further comprising:

a damper supply passage fluidically connecting the pump to the damper.

3. The fluid distribution system of claim 2, wherein a portion of the damper supply passage extends through a fan shaft support structure.

4. The fluid distribution system of claim 2, wherein substantially all of the damper supply passage extends through a fan shaft support structure.

5. The fluid distribution system of claim 2, wherein the damper supply passage is less than about 2 feet (about 0.6096 meters) long.

6. The fluid distribution system of claim 1, wherein the fan drive gear system includes gears having bearings, and further comprising:

a gear bearing supply passage fluidically connecting the pump to the bearings of the gears of the fan drive gear system.

7. The fluid distribution system of claim 1, and further comprising:

a valve fluidically connecting an auxiliary reservoir and a sump to the pump.

8. The fluid distribution system of claim 1, wherein the pump is an auxiliary lubrication pump and the spool is a low pressure spool.

9. The fluid distribution system of claim 1, and wherein the fan drive gear system causes the fan shaft to rotate at a slower rotational velocity than that of the spool.

10. The fluid distribution system of claim 1, and wherein the fan drive gear system includes a star gear coupled between a ring gear and a sun gear.

11. A fluid distribution system for use in a gas turbine engine, the fluid distribution system comprising:

a fan connected to a fan shaft;

a bearing supporting the fan shaft;

a wide damper supply passage capable of providing a lubricating fluid to a narrow damper supply passage;

a damper supporting the bearing, the damper comprising:

an inner annular sleeve opposite an outer annular sleeve defining the narrow damper supply passage, wherein the narrow damper supply passage is narrow as compared to a wide damper supply passage and receives the lubricating fluid from the wide damper supply passage; and a high pressure lubricating liquid positioned in the damper supply passage;

a pump connected to and driven by the fan shaft through gearing and fluidically connected to the damper; and a bearing compartment supporting the fan shaft and containing the pump, the damper, and the bearing.

12. The fluid distribution system of claim 11, wherein the bearing is a No. 1 bearing of the gas turbine engine.

* * * * *